March 4, 1958 — F. D. LOW — 2,825,348
SIGNAL AND CONTROL CIRCUITS FOR DISHWASHING APPARATUS
Filed Nov. 29, 1955 — 2 Sheets-Sheet 1

INVENTOR.
Frank D. Low

March 4, 1958 F. D. LOW 2,825,348
SIGNAL AND CONTROL CIRCUITS FOR DISHWASHING APPARATUS
Filed Nov. 29, 1955 2 Sheets-Sheet 2

| STEPS OF PROGRAM CONTROLLER 1 STEP EACH 45 SECONDS |
| 0 | 4 | 8 | 12 | 16 | 20 | 24 | 28 | 32 | 36 | 40 | 44 | 48 | 52 | 56 | 60 | 64 | 68 | 72 |

SWITCHES: S1, S2, S3, S4, S5, S6, S7, S8

Fig. 6

INVENTOR.
Frank D. Low
BY
Smith, Olsen, Baird & Miller
Attys.

A United States Patent Office 2,825,348
Patented Mar. 4, 1958

2,825,348

SIGNAL AND CONTROL CIRCUITS FOR DISHWASHING APPARATUS

Frank D. Low, La Grange Park, Ill., assignor to General Electric Company, a corporation of New York Application November 29, 1955, Serial No. 549,621

8 Claims. (Cl. 134—58)

The present invention relates to signal and control circuits for dishwashing apparatus; and it is the general object of the invention to provide such a circuit incorporating an improved signal arrangement that is governed by the program controller for the dishwashing apparatus.

Another object of the invention is to provide a signal and control circuit of the character noted, that comprises a run pilot signal that is operated to indicate that the washing cycle is in progress and a cycle pilot signal that is operated to indicate that the washing cycle has been completed.

Another object of the invention is to provide a signal and control circuit of the character noted, that embodies a gaseous discharge tube arrangement for the cycle pilot signal purpose mentioned.

Another object of the invention is to provide a signal and control circuit of the character noted, that embodies an improved relay arrangement for selectively operating the cycle pilot signal.

A further object of the invention is to provide a signal and control circuit of the character noted, that is of simplified connection and arrangement, so as to achieve economy of manufacture and reliability of operation.

Further features of the invention pertain to the particular arrangement of the elements of the signal and control circuit for the dishwashing apparatus, whereby the above-outlined and additional operating features thereof are attained.

The invention, both as to its organization and method of operation, together with further objects and advantages thereof will best be understood by reference to the following specification taken in connection with the accompanying drawings, in which.

Figure 1:
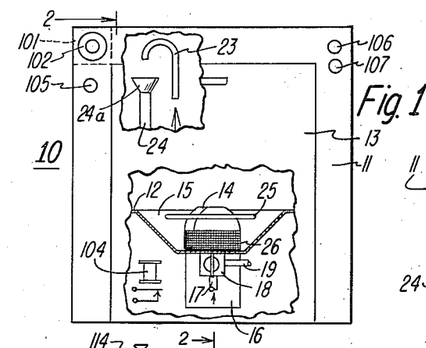
Figure 1 is a front elevational view, partly broken away, of dishwashing apparatus incorporating a signal and control circuit embodying the present invention.
Figure 2:
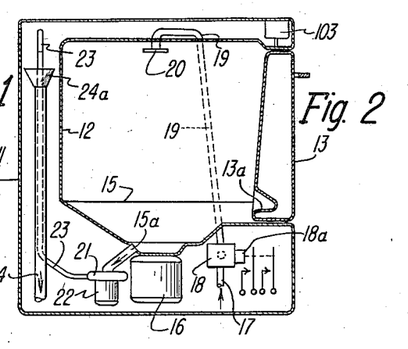
Fig. 2 is a vertical sectional view of the dishwashing apparatus, taken in the direction of the arrows along the offset line 2—2 in Fig. 1.

Referring now to Figs. 1 and 2 of the drawings, there is generally illustrated dishwashing apparatus 10 of the character of that disclosed in U. S. Patent No. 2,620,811, granted on December 9, 1952, to Forrest A. Walker, and incorporating a signal and control circuit embodying the features of the present invention. The apparatus 10 comprises an upstanding cabinet 11 housing an upstanding vat 12, the cabinet 11 and the vat 12 being provided with aligned upstanding front openings therein that are, in turn, provided with an upstanding front door 13. The front door 13 is pivotally mounted adjacent to the lower edge thereof within the lower front opening of the vat 12 and is movable between a substantially vertical closed position and a substantially horizontal open position. A pocket 13a is formed in the lower central portion of the inner wall of the front door 13 and arranged to receive a quantity of detergent that is employed in the washing of the dishes. Also, the apparatus 10 comprises removable rack structure, not shown, that is adapted to support dishes and other utensils within the vat 12 for washing purposes, the rack structure being movable into and out of the vat 12 through the front openings when the front door 13 occupies its open position. An impeller 14 is arranged within a sump 15 formed in the bottom of the vat 12 and is rotated by an associated electric drive motor 16 disposed below the bottom of the vat 12 for the purpose of producing a washing action within the vat 12, when the front door 13 occupies its closed position and wash water is contained in the sump 15.

For the purpose of supplying wash water to the vat 12, there is provided an inlet conduit 17 that is adapted to be connected to a suitable water supply system, such, for example, as a hot water tank, by intervening pipe, not shown. The inlet conduit 17 communicates with the inlet port of a valve 18; and the outlet port of the valve 18 communicates with a conduit 19 that is connected to a spray device 20 arranged substantially centrally in the top of the vat 12. The valve 18 is normally biased into its closed position and is operated therefrom into its open position by an associated solenoid 18a; whereby the hot water from the inlet conduit 17 is sprayed downwardly from the spray device 20 through the vat 12, when the valve 18 occupies its open position with the solenoid 18a in its energized condition. When the solenoid 18a is subsequently deenergized, the valve 18 is returned back into its closed position in order to cut off the supply of hot water to the spray device 20.

A drain opening 15a is provided in the bottom of the sump 15 and communicates with the intake port of a drain pump 21 that is driven by an associated electric motor 22, the pump 21 and the motor 22 being disposed below the bottom of the vat 12 adjacent to the motor 16. The drain pump 21 is also provided with a discharge port that communicates with a conduit 23 that, in turn, communicates with a drain conduit 24 that is connected to drain plumbing, not shown. The conduits 23 and 24 are arranged in upstanding relation between the rear walls of the cabinet 11 of the vat 12, the outer end of the conduit 23 being downwardly turned and separated by a gap from the adjacent upper end of the conduit 24, the extreme upper end of the conduit 24 being provided with a funnel-like structure 24a disposed below the outer or discharge end of the conduit 23 so as to provide the previously-mentioned gap therebetween. When the drain pump 21 is at rest, water introduced into the vat 12 is accumulated in the sump 15; and when the drain pump 21 is operated by the motor 22, the water accumulated in the sump 15 is removed therefrom via the drain opening 15a, and discharged via the conduit 23 into the drain conduit 24, from whence it is removed to the exterior via the drain plumbing, not shown.

Also, an electric heating unit 25 is arranged in the sump 15 in spaced-apart surrounding relation with respect to the impeller 14; which heating unit 25 is preferably of the sheated helical resistance conductor type disclosed in U. S. Patent No. 1,367,341, granted February 1, 1921, to Charles C. Abbott. Also, a reticulated screen 26 is arranged in the bottom of the sump 15 in surrounding relation with respect to the impeller 14 for the purpose of preventing soil accumulating in the sump 15 from being thrown by the operating impeller 14 back into the supported dishes in a washing operation.

Figure 3:
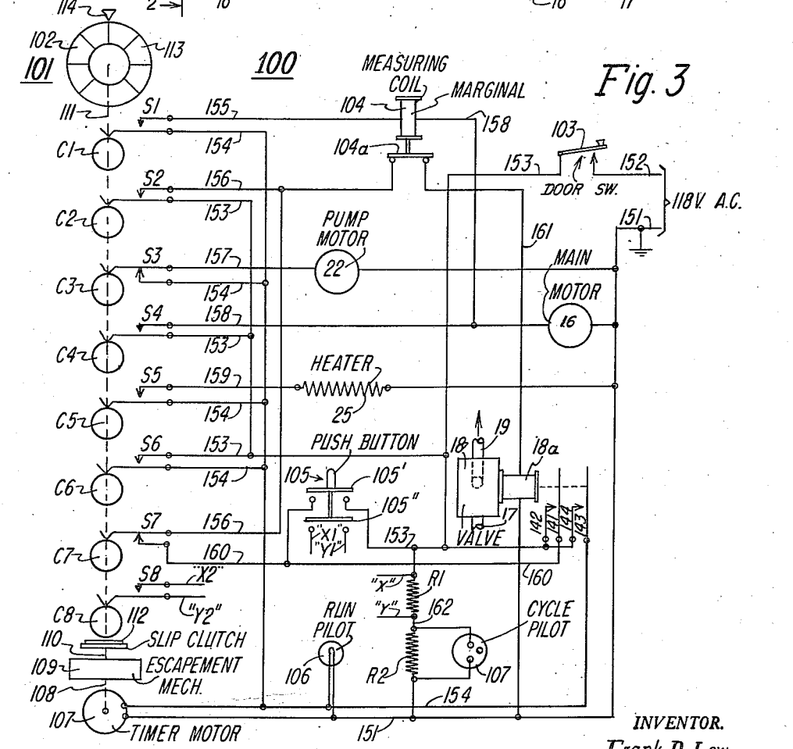
Fig. 3 is a diagrammatic illustration of the signal and control circuit incorporated in the dishwashing apparatus shown in Figs. 1 and 2.

Further, the dishwashing apparatus 10 comprises a control circuit 100, shown in Fig. 3, that includes a program controller 101 that is housed between the cabinet 11 and the vat 12, the program controller 101 being provided with a manually operable control knob or dial 102 disposed adjacent to the upper left-hand front of the cabinet 11 and readily accessible from the exterior. Also, the control circuit 100 comprises a door switch 103 housed between the cabinet 11 and the vat 12 and selectively operated in response to opening and closing of the front door 13, a measuring coil 104 arranged below the bottom of the sump 15, a pushbutton switch 105 housed between the cabinet 11 and the vat 12 and disposed below the control knob 102 and readily accessible from the exterior, as well as a run pilot lamp 106 and a cycle pilot lamp 107, also housed between the cabinet 11 and the vat 12, and disposed adjacent to the upper right-hand front of the cabinet 11 and readily visible from the exterior.

As illustrated in Fig. 3, the program controller 101 comprises a synchronous timer motor 107 preferably of the "Telechron" type provided with a drive shaft 108 that is connected to escapement mechanism 109 having a drive shaft 110. The program controller 101 further comprises a rotatably mounted operating shaft 111, the outer end of which carries the manually operable knob 102, that is provided with a skirt 113 carrying indicia, not shown, that cooperates with an index marker 114 carried by the front of the cabinet 11; whereby the cooperation between the indicia mentioned carried by the skirt 113 and the index marker 114 indicates the progress of the washing cycle, as explained more fully hereinafter. Also, the operating shaft 111 carries eight insulating control cams C1 to C8, inclusive, that respectively cooperate with eight sets of switch springs S1 to S8, inclusive; and finally, the inner end of the operating shaft 111 and the outer end of the drive shaft 110 are operatively interconnected by a slip clutch 112 of the friction plate type. In the arrangement, the operating shaft 111 may be rotated independently of the drive shaft 110 by the manual dial 102 by virtue of the interposition of the slip clutch 112; and when the timer motor 107 is operating, the drive shaft 110 is driven step-by-step on a time basis as a result of the operation of the escapement mechanism 109 so that the operating shaft 111 is correspondingly driven step-by-step by the drive shaft 110 through the slip clutch 112. Specifically, the escapement mechanism 109 is so constructed and arranged that the drive shaft 110 is driven through a small angle of about 5° in each step each 45 seconds.

Figure 4:
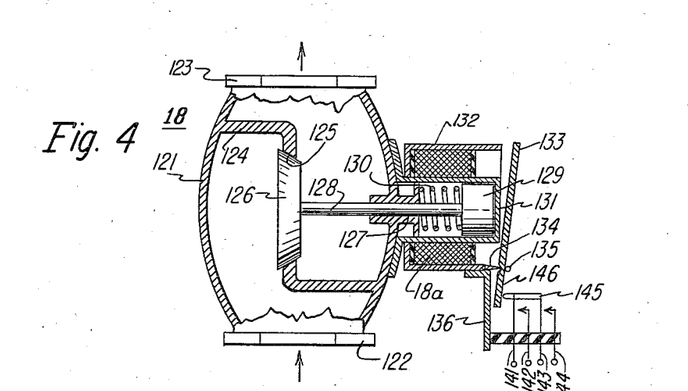
Fig. 4 is an enlarged fragmentary vertical sectional view of an electro-responsive combined water control valve and control switch that is embodied in the dishwashing apparatus of Figs. 1 and 2 and incorporated in the signal and control circuit of Fig. 3.

Referring now to Fig. 4, the valve 18 constitutes a combined water control valve and control switch, and comprises a valve casing 121 provided with an inlet port 122 that is connected to the conduit 17 and an outlet port 123 that is connected to the conduit 19, as well as an interior dividing wall 124 having a valve port 125 therein with which a valve element 126 cooperates. More particularly, the valve casing 121 is provided with a laterally extending tubular projection 127 in which there is slidably mounted a valve stem 128 that carries on its inner end the valve element 126 and that carries on its outer end a plunger 129, the valve element 126 being biased into its closed position with respect to the valve port 125 by a coil spring 130 arranged in compression between the outer end of the tubular projection 127 and the inner end of the plunger 129. The coil spring 130 is arranged in surrounding relation with respect to the outer end of the valve stem 128; and the tubular projection 127, the coil spring 130 and the plunger 129 are housed within a substantially tubular cup-shaped casing 131 projecting laterally from the valve casing 121 and sealed thereto. The solenoid 18a is arranged in surrounding relation with respect to the tubular casing 131 and positioned so that when it is deenergized the plunger 129 is disposed generally outwardly with respect thereto toward the extreme outer end of the tubular casing 131. Further, a substantially cup-shaped yoke 132 is arranged in surrounding relation with respect to the solenoid 18a; and an armature 133 is pivotally mounted upon a knife edge 134 carried by the yoke 132, the armature 133 being secured in place by a clip arrangement indicated at 135. Further, a bracket 136 is carried by the yoke 132 adjacent to the knife edge 134, and in turn supports a number of switch springs, including the individual switch springs 141, 142, 143 and 144, the switch springs 141 and 143 constituting movable switch springs connected to an insulating operating element 145 that bears against an operating arm 146 carried by the armature 133.

In the arrangement, the valve casing 121, the valve element 126 and the tubular casing 131 are formed of non-magnetic material, such, for example, as brass; whereas the valve stem 128, the plunger 129, the yoke 132 and the armature 133 are formed of magnetic material, such, for example, as soft iron. Furthermore, the inner end of the tubular casing 131 is hermetically sealed to the portion of the valve casing 121 surrounding the tubular extension 127 so as positively to prevent any water that might seep along the valve stem 128 from leaking to the exterior.

When the solenoid 18a is deenergized the plunger 129 is moved outwardly in the tubular casing 131 by the coil spring 130 so that the valve stem 128 moves the valve element 126 into a closed position with respect to the valve port 125, thereby to cut off the inlet port 122 from the outlet port 123; and the armature 133 is released so it is moved into its restored position by the resiliency of the switch springs 141 and 143 through the operating member 145 in order that the movable switch springs 141 and 143 disengage the respective stationary switch springs 142 and 144. Upon energization of the solenoid 18a, the plunger 129 is moved thereinto by the mechanical force produced by the magnetic flux, so that the valve stem 128 moves the valve element 126 with respect to the valve port 125 in order to place the inlet port 122 in communication with the outlet port 123. Also, the armature 133 is attracted by the yoke 132, incident to energization of the solenoid 18a, whereby the operating arm 146 actuates the movable switch springs 141 and 143 through the operating member 145 respectively to engage the stationary switch springs 142 and 144. The movement of the plunger 129 into the solenoid 118 compresses the coil spring 130 whereby upon subsequent deenergization of the solenoid 18a, the plunger 129 is restored into its normal position illustrated by the coil spring 130 effecting movement of the valve element 126 back into its closed position with respect to the valve port 125 and releasing the armature 133 so that it is moved back into its restored position illustrated by the resiliency of the movable switch springs 141 and 143. In the operation of the device 18, it will, of course, be appreciated that the movement of the plunger 129 into the solenoid 18a and the movement of the armature 133 toward the yoke 132, incident to the energization of the solenoid 18a, are effected by the mechanical forces tending to establish a minimum reluctance of the total magnetic path for the magnetic flux produced as a consequence of the energization of the solenoid 18a, which magnetic circuit includes the plunger 129, the armature 133, the yoke 132 and at least a portion of the valve stem 128. Accordingly, it will be understood that energization of the solenoid 18a effects both operation of the valve element 126 into its open position and operation of the switch springs 141 and 143 into their closed positions.

Again referring to Fig. 3, the control circuit 100 further comprises a source of power supply of 118-volts A. C. and including two supply conductors 151 and 152 that are respectively grounded and ungrounded, as illustrated. One terminal of the door switch 103 is connected to the supply conductor 152 and the other terminal thereof is connected to a bus 153; the two individual switch springs of the set S1 are respectively connected to a bus 154 and to a conductor 155; the two individual switch springs of the set S2 are respectively connected to the bus 153 and to a conductor 156; the two individual switch springs of the set S3 are respectively connected to the bus 154 and to a conductor 157; the two individual switch springs of the set S4 are respectively connected to the bus 153 and to a conductor 158; the two individual switch springs of the set S5 are respectively connected to the bus 154 and to a conductor 159; the two individual switch springs of the set S6 are respectively connected to the buses 153 and 154; the two individual switch springs of the set S7 are respectively connected to a conductor 160 and to the conductor 156; and the two individual switch springs of the set S8 are respectively connected to two conductors Y2 and X2. The solenoid or winding of the measuring coil 104 is connected across the conductors 155 and 158; and the measuring coil 104 is provided with a pair of contacts respectively connected to the conductor 156 and to a conductor 161, the contacts mentioned being governed by a contact bridging member 104a. The pump motor 22 is connected across the conductor 157 and the supply conductor 151; the main motor 16 is connected across the conductor 158 and the supply conductor 151; the heater 25 is connected across the conductor 159 and the supply conductor 151; the timer motor 107 and the run pilot lamp 106 are connected in parallel relation across the bus 154 and the supply conductor 151; and the solenoid 18a is bridged across the conductor 161 and the supply conductor 151. The pushbutton switch 105 comprises two contact bridging members 105' and 105'' that respectively govern associated pairs of contacts; the contacts of the pair governed by the contact bridging member 105' are respectively connected to the conductor 160 and to the bus 153; and the contacts of the pair governed by the contact bridging member 105'' are respectively connected to two conductors X1 and Y1. Further, the switch springs 141, 142, 143 and 144 respectively terminate the conductor 160, the bus 152, the bus 154 and the bus 153.

In the arrangement, the cycle pilot lamp 107 is of the gaseous discharge type, preferably a neon lamp. Further, the control circuit comprises two resistors R1 and R2 connected in series relation by a conductor 162 and bridged across the bus 153 and the supply conductor 151; and the electrodes of the cycle pilot lamp 107 are respectively connected to the opposite terminals of the resistor R2. Finally, the opposite terminals of the resistor R1 are connected to two conductors X and Y that may be respectively connected either to the conductors X1 and Y1 or to the conductors X2 and Y2. Thus, as explained more fully below, it is contemplated that the cycle pilot lamp 107 may be controlled by either of the alternative arrangements mentioned; and depending upon the connection of the conductors X—Y to the conductors X1—Y1 or to the conductors X2—Y2.

In the control circuit 100, when the program controller 101 occupies its normal or home position, the sets of switch springs S1, S2, S4, S5, S6 and S8 occupy their open positions and the set of switch springs S3 and S7 occupy their closed positions, the heater 25 is deenergized, the timer motor 107 and the pump motor 22 and the main motor 16 are deenergized, the pushbutton switch 105 occupies its open position, the solenoid 18a is deenergized so that the valve 18 occupies its closed position, and the measuring coil 104 is deenergized so that the bridging member 104a occupies its closed position. At this time, the position of the door switch 103 is governed by the position of the front door 13, the door switch 103 occupying its respective open and closed positions when the front door 13 occupies its respective open and closed positions. Finally, at this time the run pilot lamp 106 is extinguished indicating that the washing cycle is not in progress, the cycle pilot lamp 107 is extinguished indicating that a washing cycle has not just been completed, and the indicia carried by the skirt 113 of the manual knob 102 cooperates with the index marker 114 to indicate that the program controller 101 occupies its off position.

The mode of operation of the dishwashing apparatus 10 and the time-sequence of operation of the elements incorporated in the signal and control circuit 100 will best be understood in conjunction with the following description of the washing cycle of the apparatus 10, and it may be assumed that the dishes are supported by the rack structure, not shown, arranged in the vat 12, that a charge of a suitable detergent has been placed in the pocket 13a provided in the inner wall of the front door 13, and that the front door 13 occupies its closed position effecting operation of the door switch 103 into its closed position. When the door switch 103 is thus operated into its closed position, the supply conductor 152 is connected to the bus 153 and thus via the resistors R1 and R2 in series relation to the supply conductor 151. Accordingly, the line voltage is connected across the resistors R1 and R2 in series relation, whereby the initial voltage drop across the resistor R2 is applied across the electrodes of the cycle pilot lamp 107. However, the cycle pilot lamp 107 is not illuminated at this time, since the break-down voltage thereof is greater than the initial voltage drop across the resistor R2.

At this time, the operator initiates the cycle of operation of the apparatus 10 merely by momentarily operating the pushbutton switch 105; and in the present instance, it may be assumed that the conductors X—Y are respectively connected to the conductors X1—Y1; whereby the contact bridging member 105'' short-circuits the resistor R1 so that the line voltage is applied across the resistor R2, which line voltage is greater than the break-down voltage of the cycle pilot lamp 107, so that the discharge through the cycle pilot lamp 107 is initiated producing a glow or illumination thereof. When the pushbutton 105 is subsequently released, the contact bridging member 105'' removes the short-circuit around the resistor R1, whereby the line voltage is again supplied across the resistors R1 and R2 in series relation, so that the initial voltage drop again appears across the resistor R2; and while this initial voltage drop across the resistor R2 is below the break-down voltage of the cycle pilot lamp 107, it is above the sustaining voltage thereof, whereby the discharge through the cycle pilot lamp 107 is maintained so that the illumination of the cycle pilot lamp 107 is maintained subsequent to the release of the pushbutton 105.

Also when the pushbutton 105 is momentarily operated, as noted above, the bus 153 is connected to the conductor 160 at the contact bridging member 105' thereof; whereby a start circuit is completed for energizing the solenoid 18a; this circuit further includes the closed set of switch springs S7, the conductor 156, the contact bridging member 104a, the conductor 161 and the supply conductor 151. Accordingly, the energized solenoid 18a effects opening of the valve 18 and closure of the switch springs 141 and 143 with respect to the switch springs 142 and 144 in the manner previously explained. The closure of the switch springs 141—142 completes a multiple path between the bus 153 and the conductor 160; whereby the subsequent release of the pushbutton 106 and the consequent operation thereof into its open position is without effect in the subsequent operation of the control circuit 100. At the switch springs 143—144 the bus 153 is connected to the bus 154, thereby to complete obvious multiple circuits for illuminating the run pilot lamp 106 and for operating the timer motor 107, the illuminated pilot lamp 106 indicating that the washing cycle is in progress and the operating timer motor 107 effecting operation of the program controller 101 upon a timed basis in the manner previously explained. As noted above, the valve 18 is operated into its open position so that the water from the inlet conduit 17 is supplied to the spray device 20 and sprayed downwardly into the vat 12 through the dishes supported by the rack structure, not shown, and accumulates in the sump 15. When the bus 153 is connected at the switch springs 143—144 to the bus 154 a multiple circuit is completed for operating the pump motor 22; which circuit includes the closed set of switch springs S3; whereby the water accumulating in the sump 15 enters the drain pump 21 through the drain opening 15a and is pumped to the exterior by virtue of the operating pump motor 22. Specifically, the operating pump 21 delivers the water mentioned via the conduit 23 and the drain conduit 24 to the drain plumbing, not shown. Accordingly, at this time the water that is introduced into the vat 12 is discharged therefrom by the drain pump 21; which arrangement accommodates the discharge from the inlet conduit 17 into the drain conduit 24 of an initial quantity of water from the connecting hot water supply system, thereby eliminating this initial quantity of water that may be only tepid as a consequence of standing in the water supply system disposed between the hot water heater, not shown, and the dishwashing apparatus 10.

Figure 5:
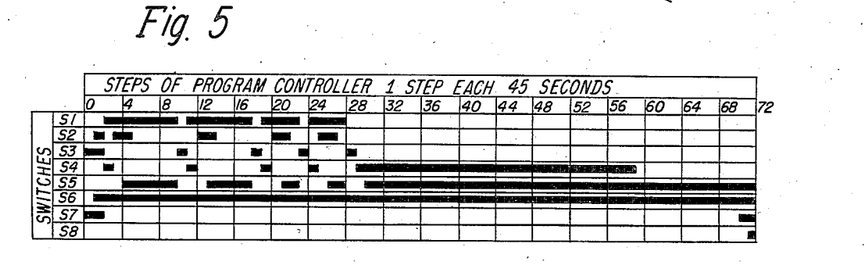
Fig. 5 is a combined time-sequence operation chart of the elements incorporated in the signal and control circuit of Fig. 3.

At the expiration of a time interval of 45 seconds, the timer motor 107 effects operation of the operating shaft 111 of the program controller 101, one step through the escapement mechanism 109 and the slip clutch 112; whereby the program controller 101 is driven out of its home position into its first control position, as indicated in Fig. 5; whereupon the sets of switch springs S2 and S6 are closed by the respective cams C2 and C6. The closure of the set of switch springs S2 completes a multiple holding circuit for energizing the solenoid 18a of the valve 18; this circuit including the supply conductor 151, the conductor 161, the contact bridging member 104a, the conductor 156, the closed set of switch springs S2, the bus 153, the door switch 103 and the supply conductor 152; thereby to maintain the valve 18 in its operated position, independently of the set of switch springs S7. The closure of the set of switch springs S6 connects the bus 153 to the bus 154, thereby to complete multiple circuits for operating the pump motor 22, for operating the timer motor 107 and for illuminating the run pilot lamp 106, independently of the operated position of the valve 18.

At the expiration of an additional time interval of 45 seconds, the operating shaft 111 of the program controller 101 is driven an additional step through the escapement mechanism 109 and the slip clutch 112; whereby the program controller 101 is driven out of its first control position and into its second control position; whereupon the sets of switch springs S2, S3 and S7 are opened and the sets of switch springs S1 and S4 are closed. The opening of the set of switch springs S2 interrupts the previously mentioned holding circuit for energizing the solenoid 18a and the opening of the set of switch springs S7 interrupts the previously mentioned start circuit for energizing the solenoid 18a; whereby the solenoid 18a is deenergized effecting operation of the valve 18 back into its closed position, as well as opening of the sets of switch springs 141—142 and 143—144. The opening of the set of switch springs S3 interrupts the circuit for operating the pump motor 22, whereby further operation of the drain pump 21 is arrested at this time. The closure of the set of switch springs S4 completes a direct circuit for operating the main motor 16; this circuit including the supply conductor 151, the conductor 158, the closed set of switch springs S4, the bus 153, the door switch 103 and the supply conductor 152. Accordingly, operation of the main motor 16 is initiated so that the impeller 14 is rotated; however, without effect at this time since the water previously introduced into the vat 12 is removed from the sump 15 by the operating drain pump 21. The closure of the set of switch springs S1 prepares a circuit hereinafter for energizing in series the measuring coil 104 and the main motor 16.

In the next step of the program controller 101 the set of switch springs S2 is closed and the set of switch springs S4 is opened. The closure of the set of switch springs S2 completes the previously traced holding circuit for energizing the solenoid 18a, whereby the valve 18 is again operated into its open position in order again to supply water into the vat 12. At this time, the closure of the set of switch springs 141—142 is without effect, since the set of switch springs S7 occupies its open position; while the closure of the set of switch springs 143—144 is of no consequence by virtue of the closed position of the set of switch springs S6. The opening of the set of switch springs S4 interrupts the direct circuit for operating the main motor 16; whereby the previously mentioned series circuit, including the measuring coil 104 for operating the main motor 16 is completed. This circuit includes the supply conductor 151, the conductor 158, the conductor 155, the closed set of switch springs S1, the bus 154, the closed set of switch springs S6, the bus 153, the door switch 103 and the supply conductor 152. Accordingly, the measuring coil 104 is energized in series relation with the main motor 16; however, the measuring coil 104 is not operated at this time as it is of the marginal type so that the contact bridging member 104a remains in its restored position retaining energized the solenoid 18a of the valve 18. Hence at this time, hot water is supplied via the spray device 20 into the vat 12 and accumulates in the sump 15, since operation of the drain pump 21 is arrested; whereby the hot water accumulating in the sump 15 is caught up by the impeller 14 and flung upwardly and outwardly in the vat 12 and through the dishes supported by the reticulated structure, not shown.

As the inlet valve 18 is retained in its open position, the amount of hot water accumulating in the sump 15 increases, thereby imposing a greater load upon the impeller 14 and consequently upon the main motor 16; whereby the operating current thereof is increased with the result that this operating current traversing the measuring coil 104 tends to effect operation thereof; and ultimately, when a predetermined quantity of hot water is accumulated in the sump 15 and constituting a full charge, the load imposed upon the impeller 14 and consequently upon the main motor 16 is such that the operating current traversing the measuring coil 104 is sufficient to effect operation thereof. Upon operating the measuring coil 104 actuates the contact bridging member 104a into its open position to interrupt the circuit for energizing the solenoid 18a with the result that the inlet valve 18 is returned into its closed position to cut off the further supply of hot water from the inlet conduit 17 to the spray device 20 and thus into the vat 12.

At this time, the first washing cycle is underway and when an adequate amount of wash water has accumulated into the sump 15, and sometime before the accumulation of the full charge of wash water in the sump 15, as described above, the upwardly directed hot water in the vat 12 returns along the inner wall of the front door 13 and into the pocket 13a so as to bring about the washing of the charge of detergent therefrom into the charge of wash water so that the washing of the dishes proceeds with the hot water containing the charge of detergent.

In the next step of the operating shaft 111, the set of switch springs S5 is closed, as indicated in Fig. 5, thereby to complete a circuit for energizing the heater 25; which circuit includes the supply conductor 151, the conductor 159, the closed set of switch springs S5, the bus 154, the closed set of switch springs S6, the bus 153, the door switch 103 and the supply conductor 152. Accordingly, at this time, the heat generated by the heater 25 is supplied to the charge of wash water in the vat 12 by virtue of the fact that the wash water comes in contact therewith as it is thrown about in the vat 12 by operation of the impeller 14; and in passing, it is mentioned that the normal level of the wash water contained in the sump 15 is in fact well below the horizontal position of the heater 25. This addition of heat to the wash water in the vat 12 prevents the normal tendency of cooling thereof as a consequence of the finely divided condition thereof produced by operation of the impeller 14.

In the next step of the operating shaft 111, the set of switch springs S2 is opened thereby further to interrupt the previously traced circuit for energizing the solenoid 18a of the valve 18 so as positively to insure that the valve 18 is returned into its closed position independently of the operated condition of the measuring coil 104, thereby positively to insure that the maximum charge of wash water into the vat 12 is not greater than a predetermined amount, in the event of failure of operation of the measuring coil 104; which predetermined amount corresponds to that which may flow through the spray device 20 in the two steps of the program controller 101 during which the set of switch springs S2 is closed, as previously explained.

The first washing step proceeds through a plurality of steps of the program controller 101, as indicated in Fig. 5, whereupon in the tenth step thereof the sets of switch springs S1 and S5 are opened, and the set of switch springs S3 is closed. The opening of the set of switch springs S1 interrupts the series circuit for energizing the measuring coil 104 and for operating the main motor 16; whereby the contact bridging member 104a is reclosed and operation of the main motor 16 is arrested to stop the impeller 14 at this time. The opening of the set of switch springs S5 interrupts the circuit for energizing the heater 25; and the closure of the set of switch springs S3 completes the circuit for operating the pump motor 22 so that the drain pump 21 is operated to effect the discharge of the wash water from the sump 15 into the drain conduit 24, in the manner previously explained.

In the eleventh step of the program controller 101, the sets of switch springs S1 and S4 are reclosed and the set of switch springs S3 is opened. The opening of the set of switch springs S3 arrests operation of the pump motor 22 and consequently of the drain pump 21; the closure of the set of switch springs S4 completes the previously traced direct circuit for operating the main motor 16; whereas the closure of the set of switch springs S1 prepares the series circuit for operating the main motor 16 via the measuring coil 104. Thus at this time, operation of the main motor 16 is resumed, whereby the impeller 14 is again operated.

In the twelfth step of the program controller 101, the set of switch springs S2 is closed and the set of switch springs S4 is opened. The closure of the set of switch springs S2 effects energization of the solenoid 18a so that the valve 18 is again operated into its open position bringing about the supply of hot water into the vat 12; and opening of the set of switch springs S4 removes the short-circuit around the measuring coil 104 so that at this time the main motor 16 and the measuring coil 104 are energized in series relation. Accordingly, at this time the measuring coil 104 again meters the quantity of hot water that is supplied into the vat 12 and is ultimately operated to effect deenergization of the solenoid 18a and the consequent return of the inlet valve 18 back into its closed position, in the manner previously explained.

In the thirteenth step of the program controller 101, the set of switch springs S5 is reclosed so as again to effect energization of the heater 25 and the consequent supply of heat to the present charge of wash water being introduced into the vat 12. In the fourteenth step of the program controller 101, the set of switch springs S2 is opened, in order to insure the return of the inlet valve 18 into its closed position, in the manner previously explained. This second washing step proceeds in the manner previously explained until the program controller 101 is driven into its eighteenth step effecting opening of the sets of switch springs S1 and S5 and closing of the set of switch springs S3, whereby operation of the main motor 16 is arrested and energization of the heater 25 is terminated and operation of the pump motor 22 is again initiated so as to bring about the discharge of the wash water into the drain conduit 24, in the manner previously explained.

As illustrated in Fig. 5, the dishwashing apparatus 10 proceeds through a third washing step in the nineteen through the twenty-three steps of the program controller 101, and then proceeds through a fourth washing step in the twenty-four through the twenty-eight steps of the program controller 101; which third and fourth washing steps are entirely similar to the first and second washing steps described in detail above, but are of slightly shorter time duration as indicated.

Accordingly, in the twenty-ninth step of the program controller 101, only the sets of switch springs S4 and S6 are closed, whereby the main motor 16 and the timer motor 107 are operated; and of course the timer 107 is operated and the run pilot lamp 106 is illuminated. In the thirtieth step of the program controller 101, the set of switch springs S5 is closed so that the heater 25 is again energized. At this time the air in the vat 12 is circulated by the operating impeller 14 through the dishes supported by the reticulated structure, not shown, and over the energized heater 25; whereby the dishes are subjected to a drying action by a blast of hot air. The above described drying step proceeds through a time interval and until the program controller 101 is driven into its fifty-ninth step; whereupon the set of switch springs S4 is opened to arrest operation of the main motor 16. Accordingly at this time, the supported dishes are merely heated by the energized heater 25 to effect further drying thereof, and without the blast of hot air, since the impeller 14 is not further operated. This static drying step proceeds through the remainder of the cycle of the program controller 101, as explained more fully below; and when the program controller 101 is driven into its seventieth step, the set of switch springs S7 is reclosed. This reclosure of the set of switch springs S7 is without immediate effect; however, it prepares the control circuit 100 for the next cycle of operation thereof so as to condition and render effective the next operation of the pushbutton 105.

When the program controller 101 is driven into its seventy-first step, the set of switch springs S8 is closed thereby connecting together the conductors X2 and Y2; which arrangement comprises the alternative facility for short-circuiting the resistor R1 in the event the conductors X—Y are respectively connected to the conductors X2—Y2, instead of to the conductors X1—Y1 in accordance with the present assumption; whereby this arrangement is without effect in view of the present assumption.

When the program controller 101 is driven into its seventy-second step, that also comprises its home or zero position, the sets of switch springs S5, S6 and S8 are opened, the set of switch springs S7 is retained in its closed position and the set of switch springs S3 is reclosed. The opening of the set of switch springs S5 interrupts the circuit for energizing the heater 25 so as to terminate the static heating step mentioned above; whereas the opening of the set of switch springs S6 disconnects the bus 153 from the bus 154 so that further operation of the timer motor 107 is arrested and the run pilot lamp 106 is extinguished. Accordingly, at this time, the composite cycle of the dishwashing apparatus 10 has been completed; however, the cycle pilot lamp 107 remains illuminated so long as the front door 13 occupies its closed position since the supply conductor 152 is connected via the door switch 103 in its closed position to the bus 153, and the resistors R1 and R2 are bridged in series relation across the bus 153 and the supply conductor 151, the voltage drop across the resistor R2 being adequate to retain conductive the cycle pilot lamp 107, as previously explained. Hence, the illumination of the cycle pilot lamp 107, after the run pilot lamp 106 is extinguished, serves to indicate that the washing cycle has been completed, but that the front door 13 has not been opened, since the completion of the washing cycle. At this time, the control circuit 100 occupies its initial position, except for the illumination of the cycle pilot lamp 107; whereby the operator may subsequently open the front door 13 and remove the rack structure, not shown, thereover to effect the removal of the dishes.

When the front door 13 is operated into its open position, the door switch 103 is operated into its open position in order to disconnect the supply conductor 152 from the bus 153 so as to bring about extinguishing of the cycle pilot lamp 107 and the restoration of the control circuit 100 into its initial condition.

In the next cycle of operation of the dishwashing apparatus 10, the return of the front door 13 into its closed position again operates the door switch 103 so as again to connect the supply conductor 152 to the bus 153 and so as to render effective the pushbutton switch 105; whereby the cycle of the dishwashing apparatus 10 may be again initiated in response to another momentary operation of the pushbutton 105, in the manner explained above. In passing, it is mentioned that when the front door 13 is again returned into its closed position effecting reoperation of the door switch 103 into its closed position, the cycle pilot lamp 107 is not illuminated immediately by virtue of the fact that the break-down voltage thereof is greater than the initial voltage drop across the resistor R2, when the resistor R2 is energized in series relation with the resistor R1, as previously explained.

In the foregoing explanation of the mode of operation of the control circuit 100, it was assumed that the conductors X—Y were respectively connected to the conductors X1—Y1; and now it is assumed that instead the conductors X—Y are respectively connected to the conductors X2—Y2; whereby the mode of operation of the control circuit 100 is slightly modified, but only with respect to the time at which the cycle pilot lamp 107 is illuminated. In the present case, the momentary operation of the pushbutton 105 is without effect with respect to the illumination of the cycle pilot lamp 107, since it is assumed that the conductors X1—Y1 are open; whereby the remainder of the cycle of the control circuit 100 is the same as that previously described. However, in the present case, when the program controller 101 is driven into its seventy-first step, the closure of the set of switch springs S8 effects the short-circuiting of the resistor R1, whereby the voltage drop across the resistor R2 is increased to bring about the break-down of the cycle pilot lamp 107. In this case, when the program controller 101 is returned back into its home position, the opening of the set of switch springs S8 merely inserts the resistor R1 again in series with the resistor R2, whereby the voltage drop across the resistor R2 is above the sustaining voltage of the cycle pilot lamp 107 so that the illumination of the cycle pilot lamp 107 is maintained after the program controller 101 is returned back into its home position, the illumination of the cycle pilot lamp 107, without the concurrent illumination of the run pilot lamp 106, serving the signal purpose previously explained.

Recapitulating, it is pointed out that when the conductors X—Y are connected to the conductors X1—Y1, the illumination of the cycle pilot lamp 107 takes place upon the operation of the pushbutton 105 at the beginning of the cycle of operation of the control circuit 100; on the other hand, when the conductors X—Y are connected to the conductors X2—Y2, the illumination of the cycle pilot lamp 107 takes place upon the operation of the program controller 101 into its step immediately preceding the return thereof back into its home position adjacent to the end of the cycle of operation of the control circuit 100. However, in either case the cycle pilot lamp 107 is retained illuminated following the cycle of operation of the control circuit 100, while the run pilot lamp 106 is retained illuminated only during the cycle of operation of the control circuit 100; whereby in either case the cycle pilot lamp 107, when illuminated, without the concurrent illumination of the run pilot lamp 106, serves the signal purpose described.

Figure 6:
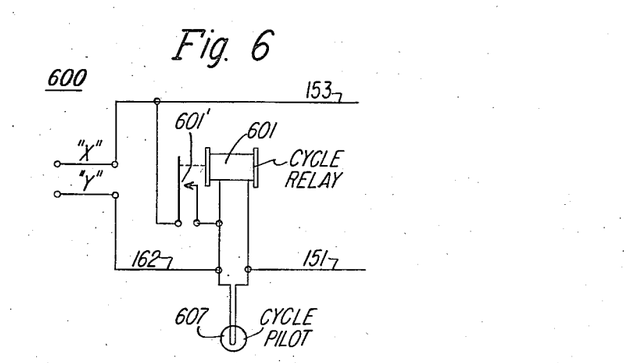
Fig. 6 is a diagrammatic illustration of a fragmentary portion of a modified form of the signal and control circuit of Fig. 3.

Turning now to the modified form of the control circuit 600, as shown in Fig. 6, and also embodying the features of the present invention, the arrangement comprises a cycle relay 101 provided with a pair of contacts 101', and a cycle pilot lamp 107' that may be of any suitable type. In this arrangement, the winding of the cycle relay 101 is bridged between the supply conductor 151 and the conductor 162, whereas the cycle pilot lamp 607 is bridged across the winding of the cycle relay 601. Further, the contacts of the pair of contacts 601' are respectively connected to the bus 153 and to the conductor 162; and finally, the bus 153 and the conductor 162 are respectively connected to the conductors X and Y. Again the conductors X and Y are connected either to the conductors X1 and Y1 or to the conductors X2 and Y2, in accordance with the alternative arrangements previously described.

Turning now to the mode of operation of this modified form of the control circuit 600, as shown in Fig. 6, it will be understood that the fundamental cycle thereof is the same as that of the control circuit 100 previously described; however, in the control circuit 600, when the conductors X—Y are connected together, a circuit is completed for energizing the winding of the cycle relay 601; whereby the cycle relay 601 operates to close its contacts 601' so as to complete a holding circuit for energizing the winding thereof in parallel relation to the present bridge across the conductors X—Y. Thus, after the bridge across the conductors X—Y is removed, by opening of the conductors X1—Y1 or the conductors X2—Y2, in the alternative arrangements, the cycle relay 601 is retained in its operated position by virtue of the completed holding circuit for energizing the winding thereof via the contacts 601' thereof. Of course, the cycle pilot lamp 607 is illuminated when the winding of the cycle relay 601 is energized, as it is bridged directly across the same.

Accordingly, in the modified control circuit 600, the cycle relay 601 is operated effecting illumination of the cycle pilot lamp 607 either at the beginning of the cycle or adjacent to the end of the cycle in the manner previously explained; whereby the cycle relay 601 is retained in its operated position following the conclusion of the cycle of the control circuit 600 for the purpose previously explained. In passing, it is mentioned that in this arrangement when the front door 13 is subsequently returned into its open position, the door switch 103 disconnects voltage from the bus 153 so as to interrupt the holding circuit for retaining operated the cycle relay 601 with the result that the cycle relay 601 restores interrupting at its contacts 601' a further point in its holding circuit. Accordingly, when the front door 13 is again returned into its closed position effecting reclosure of the door switch 103 and the consequent return of voltage upon the bus 153, the cycle relay 601 is not reoperated immediately by virtue of the open position of its contacts 601' and the open condition of the conductors X and Y with respect to each other. The operation of the other elements incorporated in the control circuit 600 is the same as that previously described in conjunction with the control circuit 100.

In view of the foregoing, it is apparent that there has been provided in dishwashing apparatus, an improved signal and control circuit that is arranged to effect an automatic cycle of operation thereof and selectively to present signals to the operator indicative of the progress of the automatic cycle so that the operator may readily discern when the automatic cycle is in progress and when the automatic cycle has been completed, all without actual inspection of the interior of the vat or the dishes therein. The arrangement is very advantageous as the operator is provided with appropriate signals so that she may instantly distinguish between a first condition of the dishwashing apparatus when the same is at rest because the cycle thereof has never been initiated following the loading of the vat with the soiled dishes and a second condition of the dishwashing apparatus when the same is at rest because the cycle thereof has been completed following the loading of the vat with the soiled dishes; whereby the signalling arrangement renders it unnecessary for the operator to remember whether the cycle has been initiated following the loading of the vat with the soiled dishes. The arrangement is particularly advantageous when the load of dishes consists essentially of drinking glasses as it is frequently difficult even upon close inspection for the operator to determine whether the drinking glasses have been washed following the last use thereof, and since it is obviously desirable to wash the drinking glasses even though they are apparently clean.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A signal and control circuit for dishwashing apparatus including a dish-receiving vat having an opening thereinto and provided with a cooperating door movable into open and closed positions with respect thereto; said circuit comprising, in combination, a program controller having a home position and a plurality of control positions, a manually operable start member operative to effect operation of said program controller out of its home position, automatic means controlled jointly by said door in its closed position and by operation of said program controller out of its home position for effecting operation thereof in a given timed cycle through its control positions and back into its home position, means selectively controlled by said given cycle of operation of said program controller through its control positions for operating said dishwashing apparatus through a given dishwashing cycle, a run pilot signal, a cycle pilot signal, a pickup circuit for operating said cycle pilot signal, a hold circuit for operating said cycle pilot signal, means responsive to movement of said door into its closed position for preparing said run pilot signal and for preparing both said pickup circuit and said hold circuit and responsive to movement of said door into its open position for arresting operation of said run pilot signal and for interrupting both said pickup circuit and said hold circuit, means responsive to operation of said program controller out of its home position for initiating operation of said prepared run pilot signal and responsive to operation of said program controller back into its home position for arresting operation of said run pilot signal, whereby said run pilot signal is operated during operation of said program controller and thus serves to indicate when operated that the dishwashing cycle is in progress, means controlled at a predetermined point in said given cycle of operation of said program controller for completing said prepared pickup circuit, and means controlled by completion of said pickup circuit for completing said prepared hold circuit, whereby said cycle pilot signal is retained operated after operation of said program controller back into its home position so that said cycle pilot signal thus serves to indicate when operated without concurrent operation of said run pilot signal that the dishwashing cycle has been completed.

2. A signal and control circuit for dishwashing apparatus including a dish-receiving vat having an opening thereinto and provided with a cooperating door movable into open and closed positions with respect thereto; said circuit comprising, in combination, a program controller having a home position and a plurality of control positions, a manually operable start member operative to effect operation of said program controller out of its home position, automatic means controlled jointly by said door in its closed position and by operation of said program controller out of its home position for effecting operation thereof in a given timed cycle through its control positions and back into its home position, means selectively controlled by said given cycle of operation of said program controller through its control positions for operating said dishwashing apparatus through a given dishwashing cycle, a run pilot signal, a cycle pilot signal, a pickup circuit for operating said cycle pilot signal, a hold circuit for operating said cycle pilot signal, means responsive to movement of said door into its closed position for preparing said run pilot signal and for preparing both said pickup circuit and said hold circuit and responsive to movement of said door into its open position for arresting operation of said run pilot signal and for interrupting both said pickup circuit and said hold circuit, means responsive to operation of said program controller out of its home position for initiating operation of said prepared run pilot signal and responsive to operation of said program controller back into its home position for arresting operation of said run pilot signal, whereby said run pilot signal is operated during operation of said program controller and thus serves to indicate when operated that the dishwashing cycle is in progress, means controlled by said program controller in a given one of its control positions for completing said prepared pickup circuit, and means controlled by completion of said pickup circuit for completing said prepared hold circuit, whereby said cycle pilot signal is retained operated after operation of said program controller back into its home position so that said cycle pilot signal thus serves to indicate when operated without concurrent operation of said run pilot signal that the dishwashing cycle has been completed.

3. A signal and control circuit for dishwashing apparatus including a dish-receiving vat having an opening thereinto and provided with a cooperating door movable into open and closed positions with respect thereto; said circuit comprising, in combination, a program controller having a home position and a plurality of control positions, a manually operable start member operative to effect operation of said program controller out of its home position, automatic means controlled jointly by said door in its closed position and by operation of said program controller out of its home position for effecting operation thereof in a given timed cycle through its control positions and back into its home position, means selectively controlled by said given cycle of operation of said program controller through its control positions for operating said dishwashing apparatus through a given dishwashing cycle, a run pilot signal, a cycle pilot signal, a pickup circuit for operating said cycle pilot signal, a hold circuit for operating said cycle pilot signal, means responsive to movement of said door into its closed position for preparing said run pilot signal and for preparing both said pickup circuit and said hold circuit and responsive to movement of said door into its open position for arresting operation of said run pilot signal and for interrupting both said pickup circuit and said hold circuit; means responsive to operation of said program controller out of its home position for initiating operation of said prepared run pilot signal and responsive to operation of said program controller back into its home position for arresting operation of said run pilot signal, whereby said run pilot signal is operated during operation of said program controller and thus serves to indicate when operated that the dishwashing cycle is in progress, means responsive to operation of said manually operable start member for completing said prepared pickup circuit, and means controlled by completion of said pickup circuit for completing said prepared hold circuit, whereby said cycle pilot signal is retained operated after operation of said program controller back into its home position so that said cycle pilot signal thus serves to indicate when operated without concurrent operation of said run pilot signal that the dishwashing cycle has been completed.

4. A signal and control circuit for dishwashing apparatus including a dish-receiving vat having an opening thereinto and provided with a cooperating door movable into open and closed positions with respect thereto; said circuit comprising, in combination, a program controller having a home position and a plurality of control positions, a manually operable start member operative to effect operation of said program controller out of its home position, automatic means controlled jointly by said door in its closed position and by operation of said program controller out of its home position for effecting operation thereof in a given timed cycle through its control positions and back into its home position, means selectively controlled by said given cycle of operation of said program controller through its control positions for operating said dishwashing apparatus through a given dishwashing cycle, a run pilot signal, a gaseous discharge tube productive of a glow when conductive, a circuit including two series connected resistors, said tube being connected across one of said resistors, means responsive to movement of said door into its closed position for preparing said run pilot signal and for completing said circuit and responsive to movement of said door into its open position for arresting operation of said run pilot signal and for interrupting said circuit, the break-down voltage of said tube being greater than the normal voltage-drop across said one resistor when said circuit is thus completed, means responsive to operation of said program controller out of its home position for initiating operation of said prepared run pilot signal and responsive to operation of said program controller back into its home position for arresting operation of said run pilot signal, whereby said run pilot signal is operated during operation of said program controller and thus serves to indicate when operated that the dishwashing cycle is in progress, and means controlled at a predetermined point in said given cycle of operation of said program controller for completing and then for interrupting a path short-circuiting at least a portion of the other of said resistors so that the voltage-drop across said one resistor is increased to a value greater than said break-down voltage of said tube and then reduced back to said normal voltage, the sustaining voltage of said tube being less than said normal voltage, whereby said tube is retained conductive after operation of said program controller back into its home position so that said tube thus serves to indicate when conductive without concurrent operation of said run pilot signal that the dishwashing cycle has been completed.

5. A signal and control circuit for dishwashing apparatus including a dish-receiving vat having an opening thereinto and provided with a cooperating door movable into open and closed positions with respect thereto; said circuit comprising, in combination, a program controller having a home position and a plurality of control positions, a manually operable start member operative to effect operation of said program controller out of its home position, automatic means controlled jointly by said door in its closed position and by operation of said program controller out of its home position for effecting operation thereof in a given timed cycle through its control positions and back into its home position, means selectively controlled by said given cycle of operation of said program controller through its control positions for operating said dishwashing apparatus through a given dishwashing cycle, a run pilot signal, an electro-responsive relay, a pickup circuit for operating said relay, a hold circuit for operating said relay, means responsive to movement of said door into its closed position for preparing said run pilot signal and for preparing both said pickup circuit and said hold circuit and responsive to movement of said door into its open position for arresting operation of said run pilot signal and for interrupting both said pickup circuit and said hold circuit, means responsive to operation of said program controller out of its home position for initiating operation of said prepared run pilot signal and responsive to operation of said program controller back into its home position for arresting operation of said run pilot signal, whereby said run pilot signal is operated during operation of said program controller and thus serves to indicate when operated that the dishwashing cycle is in progress, means controlled at a predetermined point in said given cycle of operation of said program controller for completing said prepared pickup circuit, whereby said relay is operated, means controlled by operation of said relay for completing said prepared hold circuit, whereby said relay is retained operated after operation of said program controller back into its home position, a cycle pilot signal, and means responsive to operation of said relay for operating said cycle pilot signal so that said cycle pilot signal thus serves to indicate when operated without concurrent operation of said run pilot signal that the dishwashing cycle has been completed.

6. The signal and control circuit combination set forth in claim 1, wherein said predetermined point in said given cycle of operation of said program controller is near the beginning thereof.

7. The signal and control circuit combination set forth in claim 1, wherein said predetermined point in said given cycle of operation of said program controller is near the end thereof.

8. A signal and control circuit for dishwashing apparatus including a dish-receiving vat having an opening thereinto and provided with a cooperating door movable into open and closed positions with respect thereto; said circuit comprising, in combination, a program controller having a home position and a plurality of control positions, a manually operable start member operative to effect operation of said program controller out of its home position, automatic means controlled jointly by said door in its closed position and by operation of said program controller out of its home position for effecting operation thereof in a given timed cycle through its control positions and back into its home position, means selectively controlled by said given cycle of operation of said program controller through its control positions for operating said dishwashing apparatus through a given dishwashing cycle, an electro-responsive run pilot signal, means for operating said run pilot signal only concurrently with operation of said program controller through said given cycle, whereby said run pilot signal when operated indicates that the dishwashing cycle is in progress, an electro-responsive cycle pilot signal, means controlled at a predetermined point in said given cycle of operation of said program controller for initiating operation of said cycle pilot signal, and means responsive to subsequent movement of said door into its open position for arresting operation of said cycle pilot signal, whereby said cycle pilot signal when operated without concurrent operation of said run pilot signal indicates both that the dishwashing cycle has been completed since said door was last moved into its closed position and that since the completion of the dishwashing cycle said door has not been moved again into its open position.

References Cited in the file of this patent

UNITED STATES PATENTS

| | | |
|---|---|---|
| 2,097,335 | Memmel | Oct. 26, 1937 |
| 2,236,429 | Hipsley | Mar. 25, 1941 |
| 2,624,352 | Illian | Jan. 6, 1953 |
| 2,671,455 | MacDonald | Mar. 9, 1954 |
| 2,707,961 | Geiger | May 10, 1955 |
| 2,710,010 | Lengvenis | June 7, 1955 |